United States Patent [19]

Segawa et al.

[11] Patent Number: 4,707,321

[45] Date of Patent: Nov. 17, 1987

[54] METHOD FOR FORMING ARTICLES BY INJECTION MOLDING

[75] Inventors: Takashi Segawa, Kanagawa; Kunio Tsuboi, Saitama, both of Japan

[73] Assignee: Sony Corporation, Tokyo, Japan

[21] Appl. No.: 788,740

[22] Filed: Oct. 17, 1985

[30] Foreign Application Priority Data

Oct. 18, 1984 [JP] Japan .................................. 59-218824

[51] Int. Cl.4 ........................ B29C 43/04; B29C 45/04
[52] U.S. Cl. .................................... 264/294; 264/1.3;
264/106; 264/107; 264/328.7; 425/810
[58] Field of Search ....................... 264/40.1, 40.5, 106,
264/107, 294, 328.1, 328.7, 331.12, 331.18, 1.3;
425/590, 542, 810

[56] References Cited

U.S. PATENT DOCUMENTS

| 3,196,485 | 7/1965 | Battenfeld et al. | 425/810 |
| 3,940,465 | 2/1976 | Hauser et al. | 264/40.5 |
| 4,089,926 | 5/1978 | Taylor | 264/294 |
| 4,185,955 | 1/1980 | Holmes et al. | 425/568 X |
| 4,472,124 | 9/1984 | Kashihara et al. | 264/107 X |
| 4,540,534 | 9/1985 | Grendol | 264/328.7 X |

Primary Examiner—Jan H. Silbaugh
Assistant Examiner—James Bartholomew
Attorney, Agent, or Firm—Hill, Van Santen, Steadman & Simpson

[57] ABSTRACT

In a method for forming articles by injection molding, in which a melted plastic material is injected into a cavity formed between a movable die and a stationary die, the method including the steps of injecting the melted plastic material into the cavity under the condition of substantially no pressure, and pressing the movable die against the stationary die during or after injection so as to press-mold the article.

4 Claims, 9 Drawing Figures

FIG. I

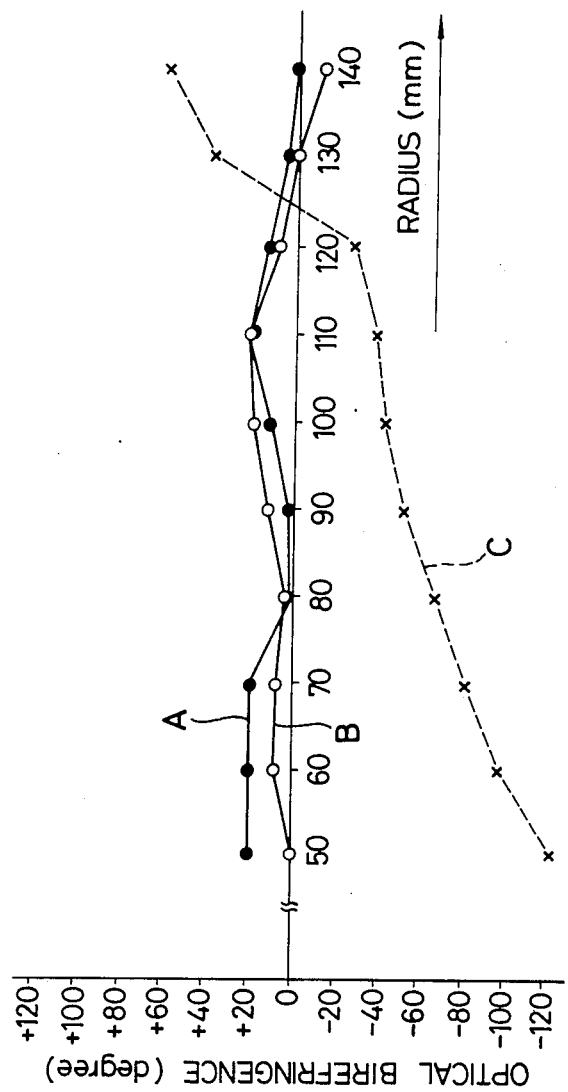

METHOD FOR FORMING ARTICLES BY INJECTION MOLDING

BACKGROUND OF THE INVENTION

1. Field of the Invention

This invention relates generally to a method of forming articles by injection molding, and more particularly concerns a method and an apparatus for forming an optical disc such as video disc, DRAW disc or erasable disc by injection molding.

2. Description of the Prior Art

As an example of prior art for forming a video disc by injection molding, we may take U.S. Pat. No. 4,185,955. According to this prior art, melted plastic material is injected into a cavity formed between dyes which are in a mutually thrusted state (a state that a movable die is pressed against a stationary die at a high pressure of several hundred tons) in order to obtain a video disc into which signal patterns (pits) in a stamper are copied.

In forming optical discs such as the video disc by injection molding, it is important that signal patterns in a stamper are copied well (that the signal patterns in the whole area of the stamper from its center to its skirt are uniformly copied), that birefringence of the disc (which means, in this case, a phase shift between incident light beams and reflected light beams for reading signal patterns in a disc, and which are mainly caused by internal strains in the disc) is made small as much as possible when the disc is formed by injection molding, etc. When brefringence is large, the signal patterns in the disc cannot be read by a detector. Particularly, in optical discs such as the DRAW disc for both signal writing and signal readout, it makes the matter very serious that written signals cannot be read later. In order to obtain a good copy from the stamper and make birefringence of the disc small, it becomes important how to form the disc.

Not a compact video disc (with a diameter of 12 cm) but a large video disc (with a diameter of 20 to 30 cm) is conventionally formed by injection molding using acrylic resin having a good moldability (which means that the melted plastic material has a good flowability in a cavity formed between dies, so that it becomes easy to mold), but there are a few problems as follows:

(A) Since acrylic resin is very hygroscopic, an aluminum film cannot be strongly adhered, so that it, for example, tends to peel off as time passes.

(B) Since acrylic resin is of low heat resistance, two discs cannot be heated to a high temperature when a double-sided disc is made through adhesion between the two discs so that adhesion strength between the two discs becomes low.

(C) Since acrylic resin is of low impact resistance, it can be easily damaged by the impact worked when dropped or other loads.

Thus, the small-sized compact disc is conventionally formed by injection molding using polycarbonate resin, as polycarbonate resin has a lower hygroscopicity, a higher heat resistance and a higher impact resistance as compared with acrylic resin. Therefore, if the large video disc is formed using polycarbonate resin, the above-mentioned problems (A), (B) and (C) can be overcome.

The present inventor conducted an experiment with forming a large-sized video disc using polycarbonate resin after the same method of injection molding as disclosed in U.S. Pat. No. 4,185,955.

However, the disc obtained as the result of this experiment had not only a poor copy of signal patterns of the stamper in its skirt portion, but also such large birefringence that only the portion on or near the radius of 125 cm of the disc satisfied a practical birefringence range of $\pm 35°$, so that signals could not be read therefrom.

It was considered such that poly-carbonate resin has low moldability as compared with acrylic resin and high photoelastic modulus, so that flowability of the melted plastic material in the cavity is largely varied in the radius direction of the disc. That is, in case of forming small-sized discs such as the compact disc, the melted plastic material has comparatively good flowability in the cavity and there is scarcely a pressure difference between the central portion and the skirt portion of the disc. On the contrary, in case of large-sized discs such as the video disc, the melted plastic material has considerably lower flowability in the cavity and undesirable stresses are generated in the melted plastic material in the cavity. As a result, polymer content and residual stressses are not uniformly distributed over the whole extent from the central portion to the skirt portion of the disc in the cavity, so that internal strains seem to be much generated.

SUMMARY OF THE INVENTION

It is an object of the present invention to provide a method for forming articles by injection molding, wherein flowability of a melted plastic material injected into a cavity is greatly improved and internal strains of the melted plastic material is made small as much as possible.

It is another object of the present invention to provide a method for forming articles by injection molding, wherein an injection-molded article having small birefringence can be obtained only by controlling a time to bring dies into a mutually thrusted state during injecting the melted plastic material into a cavity formed by the dies.

It is a further object of the present invention to provide a method for forming articles by injection molding, at the time of which there works no excessive force on a stamper owing to the use of an auxiliary die, and which can be thereby repeated over a long period of time, so that the method is suited for mass-production of optical discs.

It is still a further object of the present invention to provide a method for forming articles by injection molding in which melted plastic material is injected into a cavity formed between a movable die and a stationary die, and which further comprises the steps of closing the movable die onto the stationary die under the condition of substantially no pressure, injecting the melted plastic material into the cavity, and thereby, slightly releasing away the movable die from the stationary die by the pressure of the injected melted plastic material, and pressing the movable die to the stationary die during or after injection.

BRIEF DESCRIPTION OF THE DRAWINGS

FIG. 9 is a diagram showing the difference in birefringence between a disc formed by the method of the present invention and one formed by the conventional method.

DESCRIPTION OF THE PREFERRED EMBODIMENT

An example of the present invention which is applied to an apparatus for forming optical discs by injection molding will be described hereinafter with reference to accompanying drawings.

Figure 1:
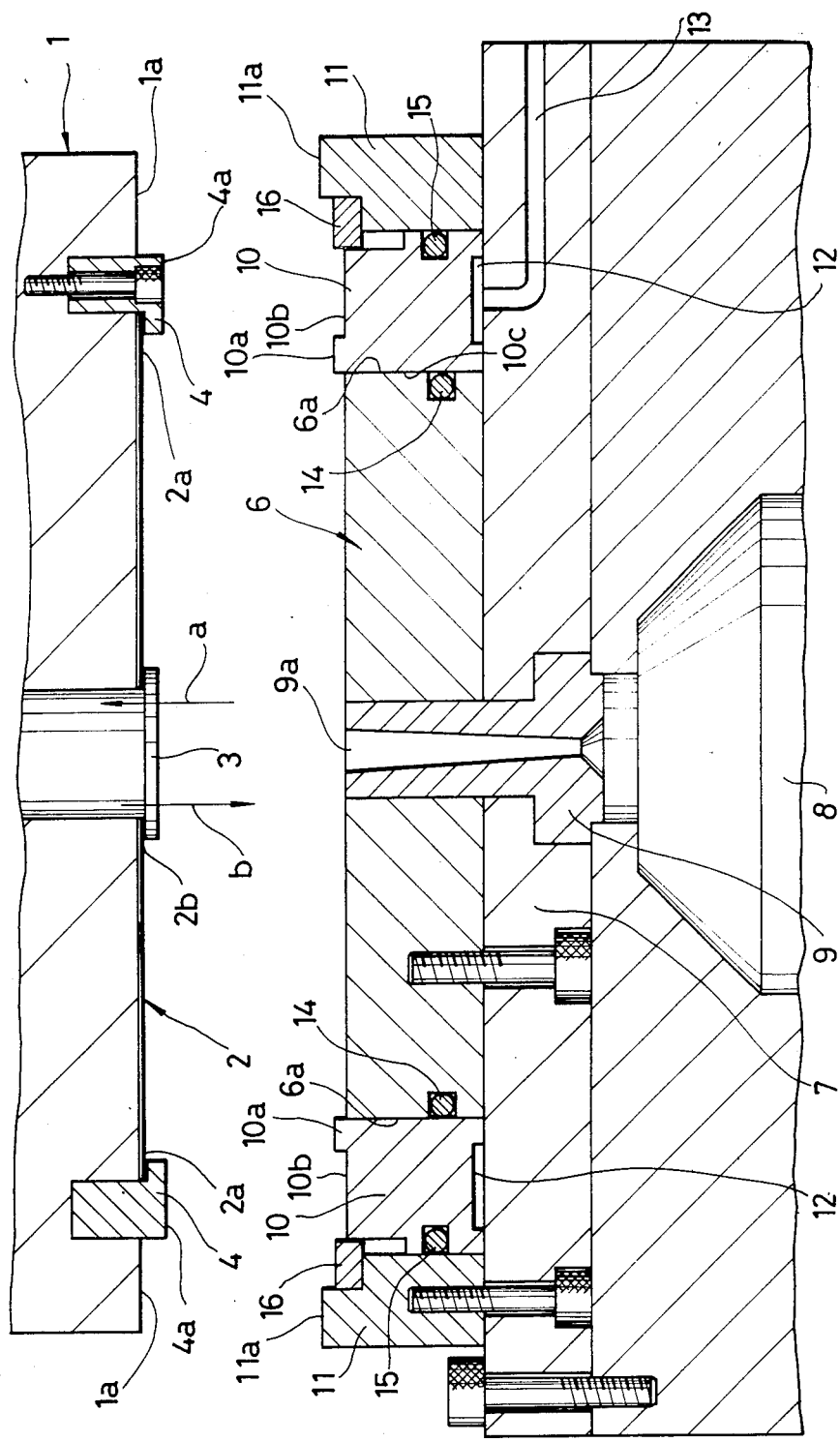
FIG. 1 is a sectional view of dies for injection molding which are used in the present invention, and particularly shows a state wherein a movable die is located apart from a stationary die.

As shown in FIG. 1, a stamper 2 is fixed to a movable die 1, using a center holder 3 and a skirt holder 4. A stationary die 6 is fixed to a base 7. A sprue bushing 9 is provided in the central portion of the stationary die 6. The bushing 9 is coupled with an injection nozzle 8 and has an opening 9a at its distal end. An annular auxiliary die 10 is movably provided on the outer periphery of the stationary die 6, and on the outer periphery of the auxiliary die 10, there is provided an annular member 11 which is fixed to the base 7. An annular projection 10a integral with the auxiliary die 10 can be fitted into the inner periphery of the skirt holder 4. An annular air cylinder 12 is provided at a rear end side of the auxiliary die 10 and in front of the base 7. An air supply path 13 formed in the base 7 is connected with the air cylinder 12. O-rings 14 and 15 for preventing air leakage are placed between the stationary die 6 and the auxiliary die 10, and between the auxiliary die 10 and the annular member 11, respectively. A stopper 16 for preventing removal of the auxiliary die 10 is provided at a distal end 11a of the annular member 11.

An operation for molding a disc with the above-mentioned dies, using polycarbonate resin will be described hereinafter.

FIG. 1 shows a state wherein the movable die 1 is moved in a direction of arrow a and located apart from the stationary die 6.

Figure 2:
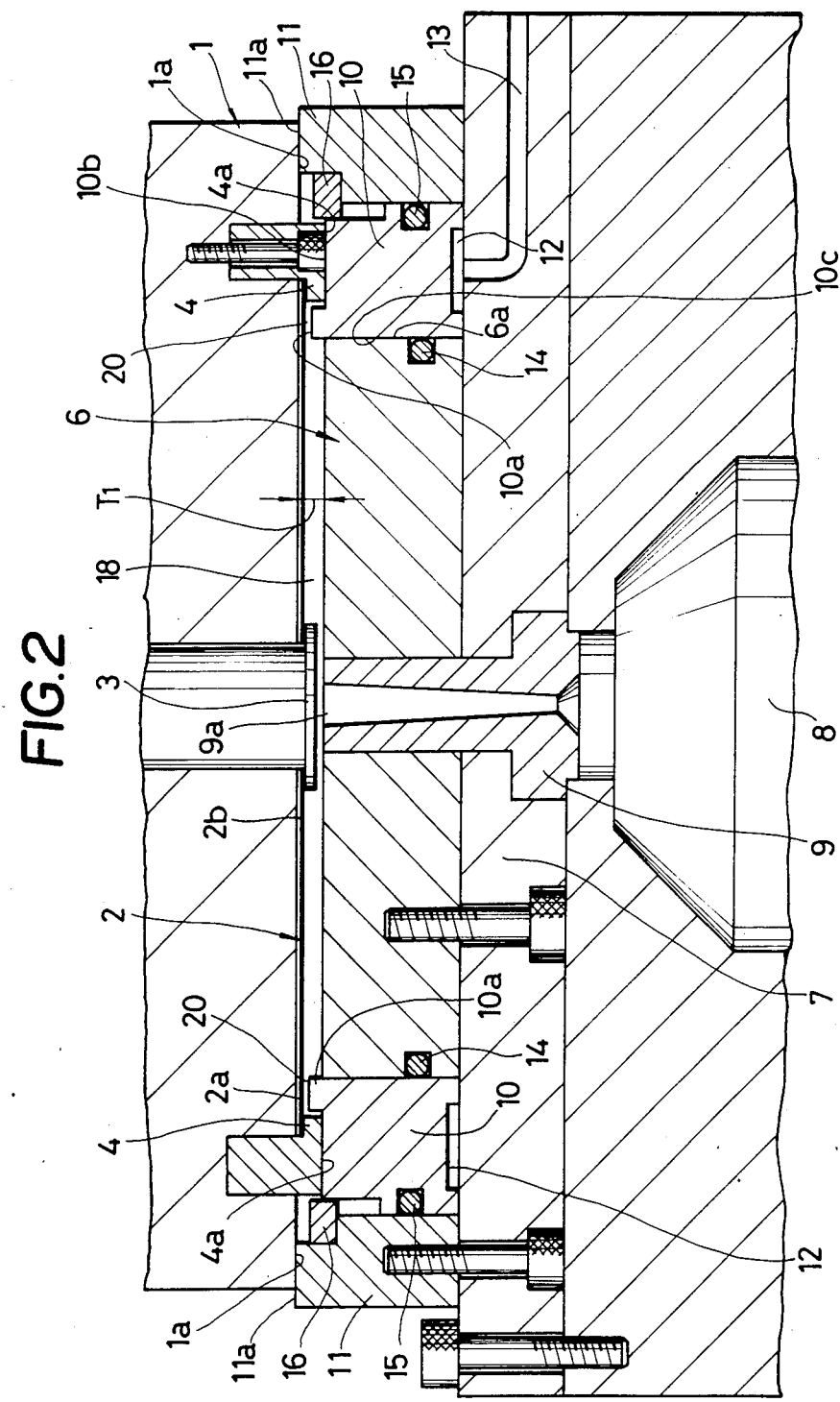
FIG. 2 is a sectional view showing a state wherein the movable die is moved from the state shown in FIG. 1

When the movable die 1 in the state shown in FIG. 1 is moved in a direction of arrow b in FIG. 1, the skirt portion 1a of the movable die 1 abuts against the distal end 11a of the annular member 11 secured to the stationary die 6 as shown in FIG. 2, so that the dies 1 and 6 are closed. Then, the annular projection 10a of the auxiliary die 10 is fitted into the inner periphery of the skirt holder 4, and a cavity 18 defined by the inner periphery of the auxiliary die 10 is formed between the dies 1 and 6.

Under the closed state, the pressure through which the movable die 1 is pressed against the stationary die 6 is about 0 kg/cm².

Figure 3:
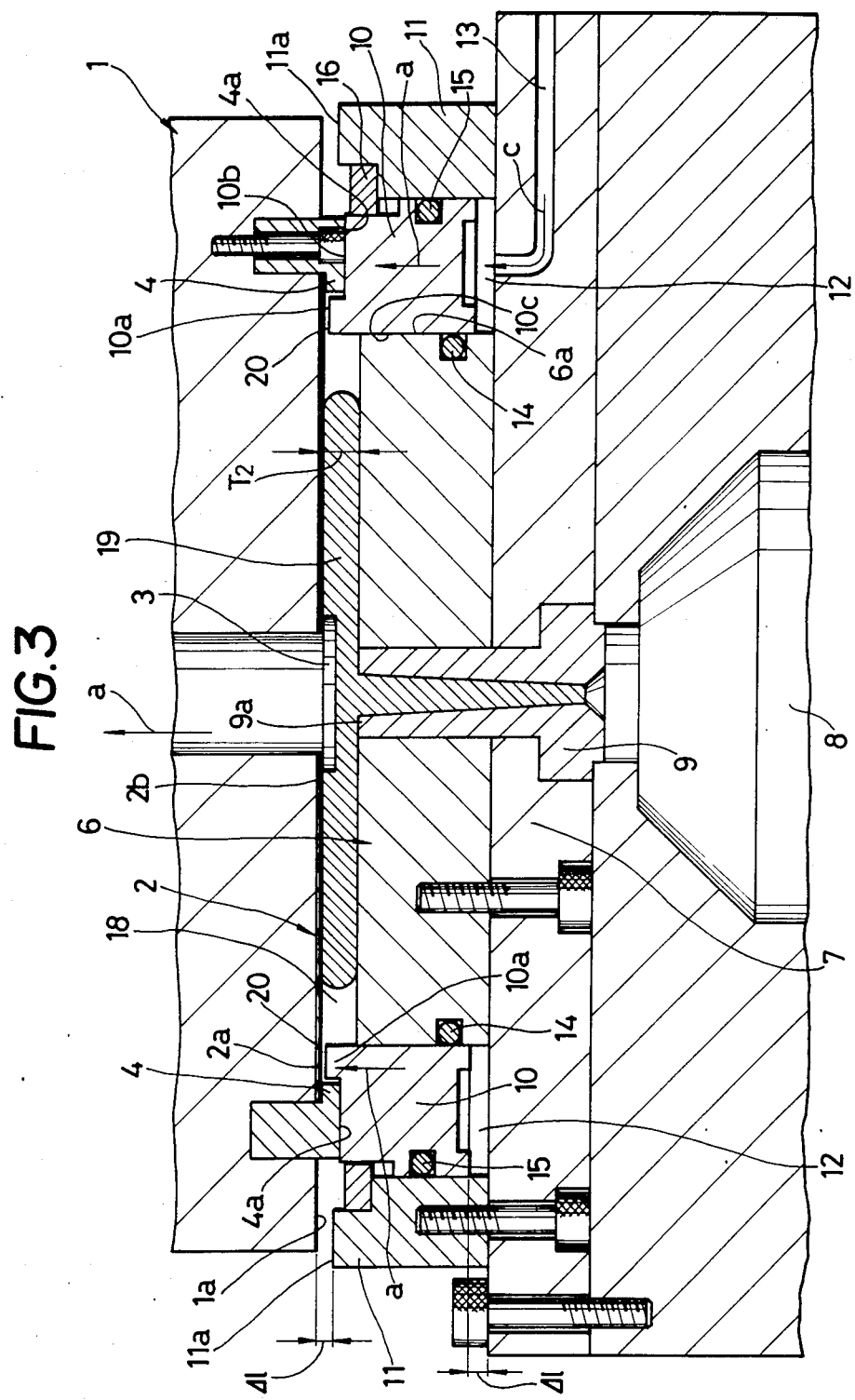
FIG. 3 is a sectional view showing a state wherein a melted plastic material is injected into a cavity formed by the dies.

As shown in FIG. 3, a melted plastic material, polycarbonate resin 19 is injected into the cavity 18 through the sprue bushing 9 from the injection nozzle 8, and when melted polycarbonate resin 19 is injected, the movable die 1 is retreated by Δl in the direction of arrow a in FIG. 3, because the pressure is about 0 kg/cm² when melted poly-carbonate resin 19 is injected. Thus, the gap between the dies 1 and 6 increases from T1 in FIG. 2 to T2 in FIG. 3. As the result, the pressure in the cavity 18 becomes close to the atmospheric pressure, so that melted polycarbonate resin 19 is injected into the cavity 18 under the condition that no pressure is substantially applied. Then, flowability of melted polycarbonate resin 19 is very good in the cavity 18 and undesirable stresses are not generated in melted polycarbonate resin 19.

In the meanwhile, almost simultaneously with injection of resin 19, the pressurized air is supplied through the air supply path 13 into the air cylinder 12 in a direction of arrow c as shown in FIG. 3, so that the auxiliary die 10 is moved in the direction of arrow a by the pressurized air. That is, the auxiliary die 10 is moved forward by Δl in the direction of arrow a as the movable die 1 is retreated by Δl in the direction of arrow a. At this time, the distal end of the auxiliary die 10 abuts at its lower portion 10b against a distal end 4a of the skirt holder 4, so a slight gap 20 necessary for exhausting the air is provided between the annular projection 10a and a skirt portion 2a of the stamper 2. Accordingly, if the auxiliary die 10 is moved in the direction of arrow a, the annular projection 10a is never pressed against the skirt portion 2a of the stamper 2, and the air in the cavity 18 is always exausted through the gap 20.

Figure 4:
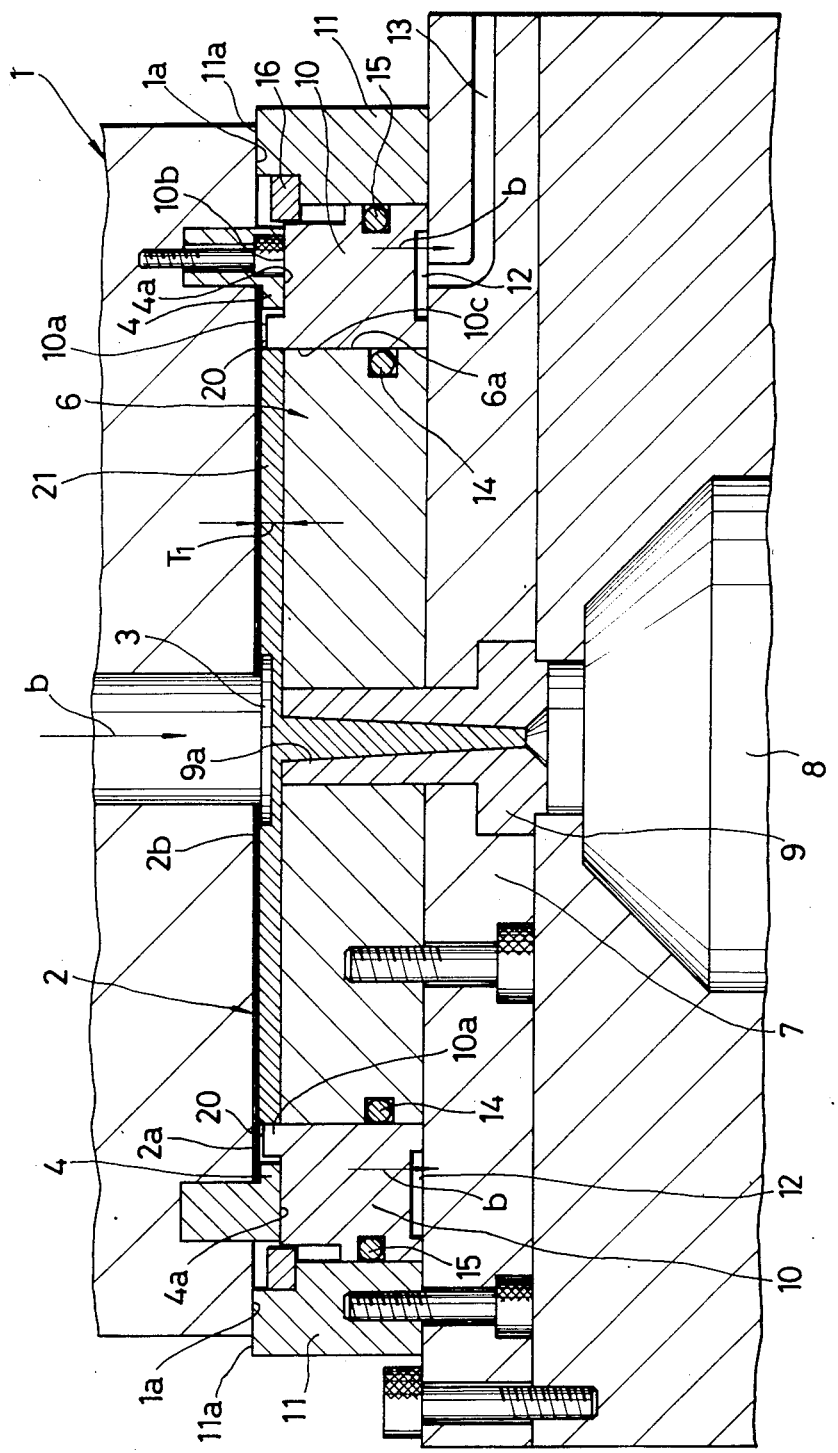
FIG. 4 is a sectional view showing a state wherein the movable die is urged against the stationary die with a predetermined pressure during or after injection.

The movable die 1 is pressed in the direction of arrow b through a high pressure (several hundred tons) during or after injection of melted polycarbonate resin 19 into the cavity as illustrated in FIG. 4. At this time, the movable die 1 is moved forward in the direction of arrow b by Δl, and simultaneously with the movement of the movable die 1, the auxiliary die 10 is retreated by Δl in the direction of arrow b against the air pressure in the air cylinder 12, because the distal end 4a of the skirt holder 4 urges the lower portion 10b of the auxiliary die 10. However, the slight gap 20 necessary for exausting the air still remains between the annular projection 10a of the auxiliary die 10 and the skirt portion 2a of the stamper 2.

Thus, by the use of melted polycarbonate resin 19, a disc 21 having a desired thickness is press-molded, and signal patterns (pits) in the stamper 2 are copied in the disc 21. In this case, the air in the cavity 18 is exausted through the very slight gap 20, so the melted polycarbonate resin 19 pressurized in the cavity 18 is dammed by the inner surface of the auxiliary die 10, and does not undesirably flow out through the gap 20.

After press molding, the injection pressure of the melted polycarbonate resin 19 is kept unchanged and the dies 1 and 6 are cooled.

With the dies constituted as mentioned above and operated in the above manner, the air is always sufficiently exausted from the cavity 18 through the slight gap 20 and further, the skirt portion 2a of the stamper 2 is not undesirably pressed by the annular projection 10a of the auxiliary die 10, so that wrinkles are not acquired in the skirt portion 2a of the stamper 2. And it does not also occur that the melted polycarbonate resin 19 undesirably permeates and sets between the skirt holder 4 and the skirt portion 2a of the stamper 2, so that wrinkles are not acquired in the skirt portion 2a of the stamper 2 at the time when the dies are successively opened.

In addition, undesirable stresses are not generated in melted plastic material 19 when the melted plastic material 19 is injected into the cavity 18. Furthermore, as the melted plastic material 19 in the cavity 18 is uniformly pressurized by the movable die 1 (it is very important so as to uniformly pressurize the melted plastic material 19, that no wrinkles are acquired in the skirt portion 2a of the stamper 2 when the movable die 1 is pressed against the stationary die 6 . . . ), the copy of the signal pattern is much improved not only in the center portion 2b of the stamper 2, but also in the skirt portion 2a of the stamper 2. In addition, polymer content and residual stress of the disc 21 becomes substantially uniform over a whole area of the disc, i.e., from the center portion to the skirt portion of the disc, and substantially no internal strain occurs in the disc 21, so that birefringence of the disc becomes very small as will be described later.

The auxiliary die 10 is slidably mounted on the stationary die 6 and moved in the directions of arrows a and b, and the heat of the stationary die 6 is constantly conducted to the auxiliary die 10, so that no difference in temperature substantially occurs between the auxiliary die 10 and the stationary die 6. Thus, no seam caused by a difference in thermal expansion coefficient between the auxiliary die 10 and the stationary die 6 is generated. Therefore, no gap is formed at a sliding portion between the inner surface 10c of the auxiliary die 10 and an outer surface 6a of the stationary die 6. Conventionally, if a gap resulting from seams is formed at the slid portion, the melted plastic material 19 injected into and pressurized in the cavity 18 easily flows into the gap, thereby forming a burr. However, with the dies of the present invention, no burr occurs.

A drive circuit for driving the dies having the above-mentioned constitution will now be described with reference to FIGS. 5 to 8. A direct pressure type hydraulic circuit is shown in FIGS. 5 to 8.

A ram 24 for moving the movable die 1 forward-/backward is supported by a ram cylinder 25. First and second hydraulic cylinders 26 and 27 for moving the ram 24 forward and a third hydraulic cylinder 28 for moving the ram 24 backward are provided in the ram cylinder 25. A prefill valve 29 for operating the second hydraulic cylinder 27 is provided in the ram cylinder 25. The prefill valve 29 is operated by a fourth hydraulic cylinder 30 and a spring 31. A hydraulic pressure supply path 32 for the first and second hydraulic cylinders 26 and 27 and a hydraulic pressure supply path 33 for the third hydraulic cylinder 28 are connected with the hydraulic pump 35 and an oil tank 36 through a first selector 34 serving as a three-position selector. A hydraulic pressure supply path 37 for the fourth hydraulic cylinder 30 is connected with a hydraulic pump 39 and an oil tank 40 through a second selector 38 serving as a two-position selector. An oil tank 41 and an oil gauge 42 are connected with the second hydraulic cylinder 27. The air supply path 13 for the air cylinder 12 is connected with an air compressor 45 through a third selector 44 serving as a two-position selector. Note that the first, second and third selectors 34, 38 and 44 comprise, e.g., electromagnetic valves.

The operation of the drive circuit having the above-mentioned constitution will now be described.

Figure 5:
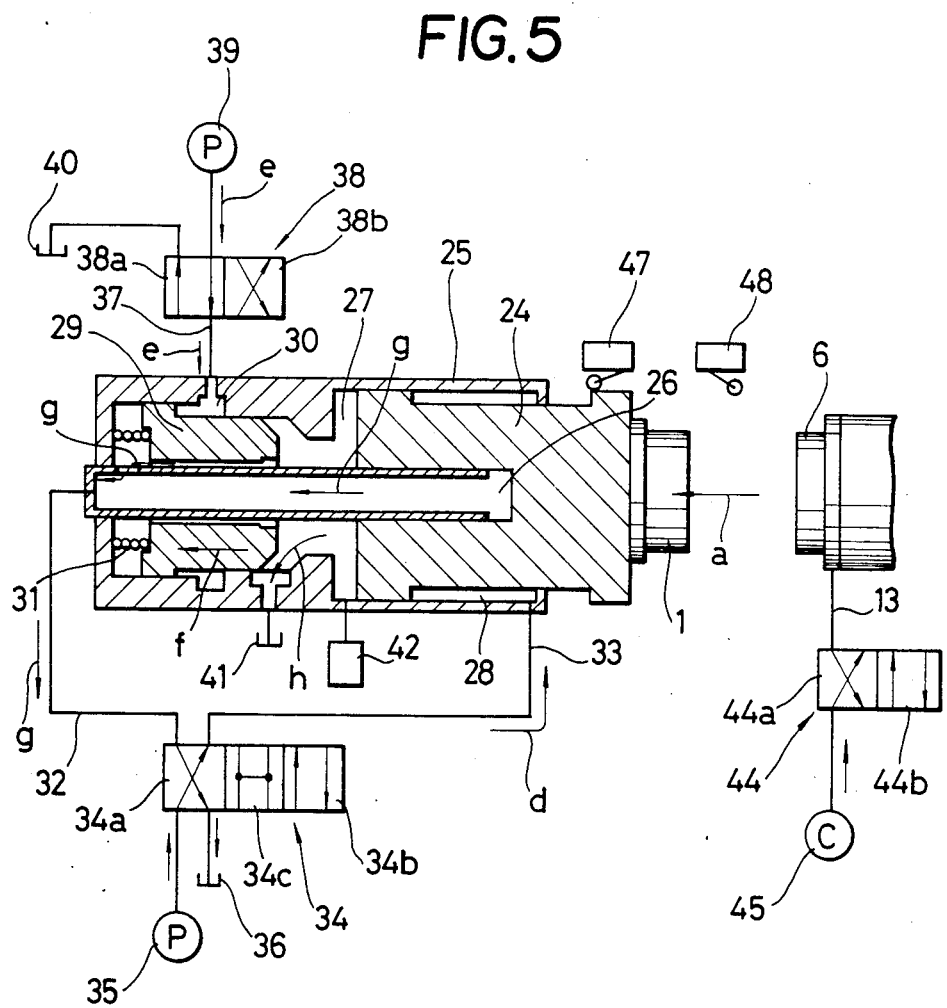
FIG. 5 is a sectional view of a movable die drive unit including a hydraulic system for controlling operation of the movable die shown in FIGS. 1 to 4, the movable die being located apart from the stationary die.

FIG. 5 shows an open state of the drive circuit. First, the first selector 34 is switched to the first position 34a at an end thereof, a hydraulic pressure is supplied from the hydraulic pump 35 in direction of arrow d into the third hydraulic cylinder 28 through the hydraulic pressure supply path 33, and the ram 24 is moved backward in the direction of arrow a. Consequently, the movable die 1 is released from the stationary die 6 in the direction of arrow a to be in the open state as shown in FIG. 1. In this case, the second selector 38 is switched to a first position 38a so that the hydraulic pressure from the hydraulic pump 39 is supplied in direction of arrow e into the fourth hydraulic cylinder 30 through the hydraulic pressure supply path 37, and the prefill valve 29 is moved backward in direction of arrow f against the spring 31. Consequently, upon the backward movement of the ram 24 in the direction of arrow a, oil in the first and second hydraulic cylinders 26 and 27 is returned into the oil tank 36 in direction of arrow g, and simultaneously a large quantity of oil in the second hydraulic cylinder 27 is returned into the oil tank 41 in direction fo arrow h. When the ram 24 reaches a rear limit position in the direction of arrow a, it is detected by a rear position detection switch 47 consisting of a limit switch and so on. The first selector 34 is switched to an intermediate third position 34c, oil supply into the third hydraulic cylinder 28 is stopped, and the ram 24 is stopped at the rear limit position, thereby completing die opening.

Then, the operation is performed from the die open state as mentioned above, and thereafter the disc 21 mentioned above is molded.

Figure 6:
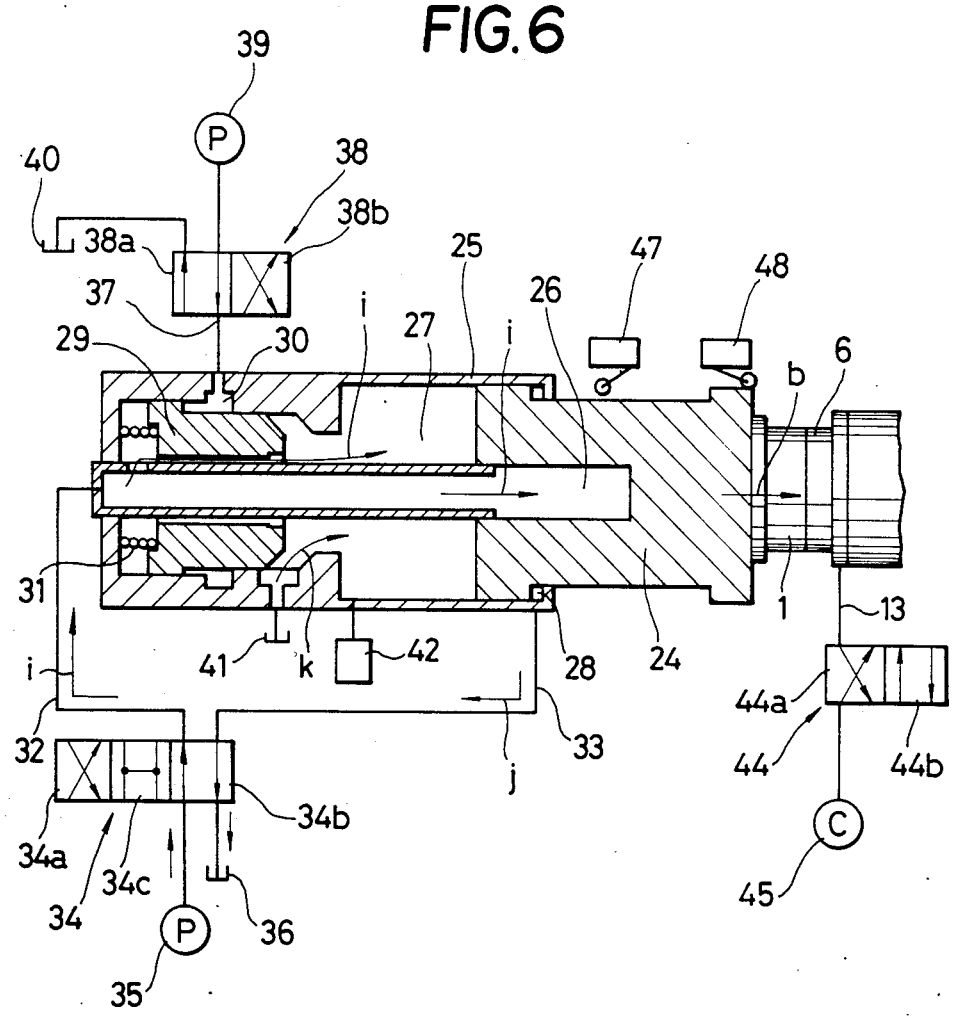
FIG. 6 is a sectional view of the movable die drive unit wherein the movable die is pressed against the stationary die.

First, as shown in FIG. 6, when the first selector 34 is switched to a second position 34b at the other end thereof, hydraulic pressure from the hydraulic pump 35 is supplied in direction of arrow i into the first and second hydraulic cylinders 26 and 27 through the hydraulic pressure supply path 32, and the ram 24 is moved forward in the direction of arrow b. Consequently, the movable die 1 abuts against the auxiliary die 11 of the stationary die 6 in the direction of arrow b as shown in FIG. 2 to be at the closed state, and the cavity 18 is defined. In this case, upon the forward movement of the ram 24 in the direction of arrow b, oil in the third hydraulic cylinder 28 is returned into the oil tank 36 in direction of arrow j, and simultaneously a large quantity of oil in the oil tank 41 is automatically drawn by vacuum suction into the second hydraulic cylinder 27 in direction of arrow k.

Figure 7:
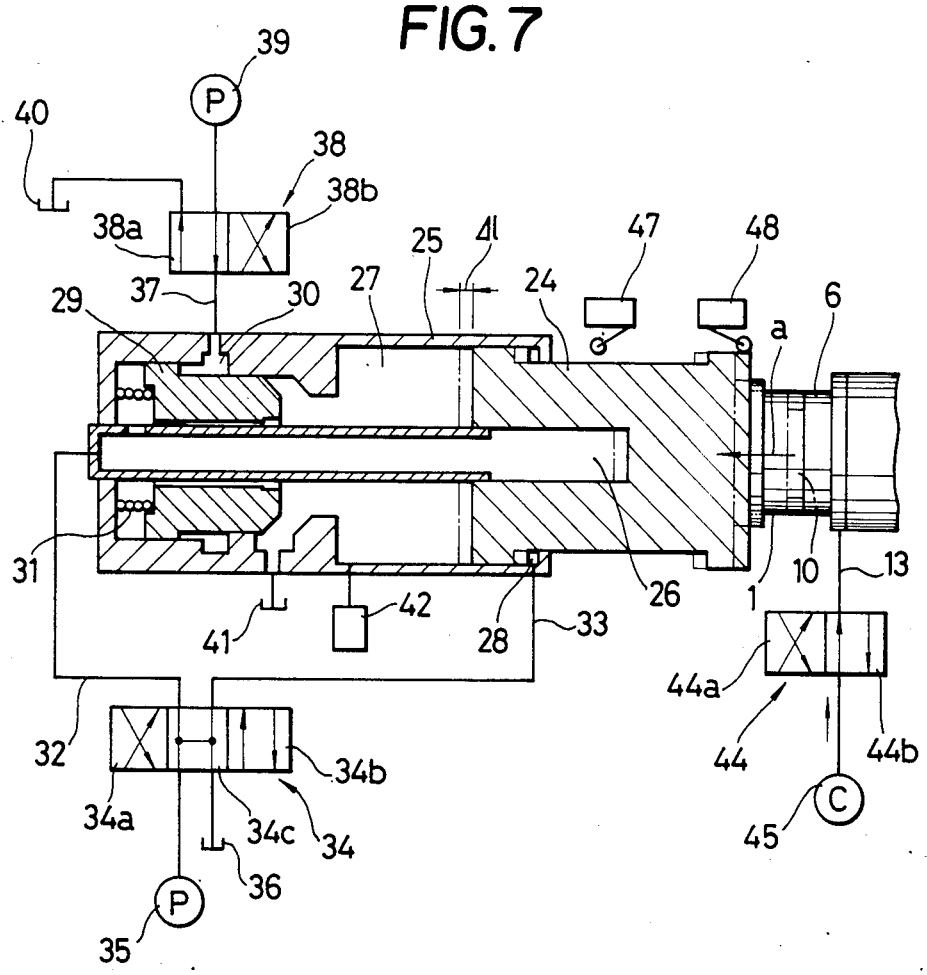
FIG. 7 is a sectional view of the movable die drive unit in a state wherein the movable die has been slightly retreated by a pressure during injection.

When the ram 24 reaches a front limit position in the direction of arrow a, it is detected by a front position detection switch 48 consisting of a limit switch and so on, the first selector 34 is again switched to the third position 34c as shown in FIG. 7, oil supply to the first and second hydraulic cylinders 26 and 27 is stopped, and the ram 24 is stopped at the front limit position, thereby completing die closing.

In the die closed state mentioned above, the pressure described with reference to FIG. 2 and applied to the movable die 1 is detected by the oil gauge 42 for detecting hydraulic pressure in the second hydraulic cylinder 27. In the die closed state, the pressure is about 0 kg/cm$^2$.

Then, after the die closing, an injection step into the cavity 18 described with reference to FIG. 3 is started.

Injection mold is started in accordance with a die close completion detection signal by the front position detection switch 48 and a pressure detection signal from the oil gauge 42.

After injection of the melted plastic material into the cavity 18 described with reference to FIG. 3 is started, the ram 24 is moved backward in the direction of arrow a by Δl by the injection pressure as indicated by an alternate long and short dashed line in FIG. 7.

In the meanwhile, the third selector 44 is switched to a second position 44b as shown in FIG. 7 almost simultaneously with the injection step as described with reference to FIG. 3. Pressurized air is supplied from the air compressor 45 into the air cylinder 12 through the air supply path 13.

Figure 8:
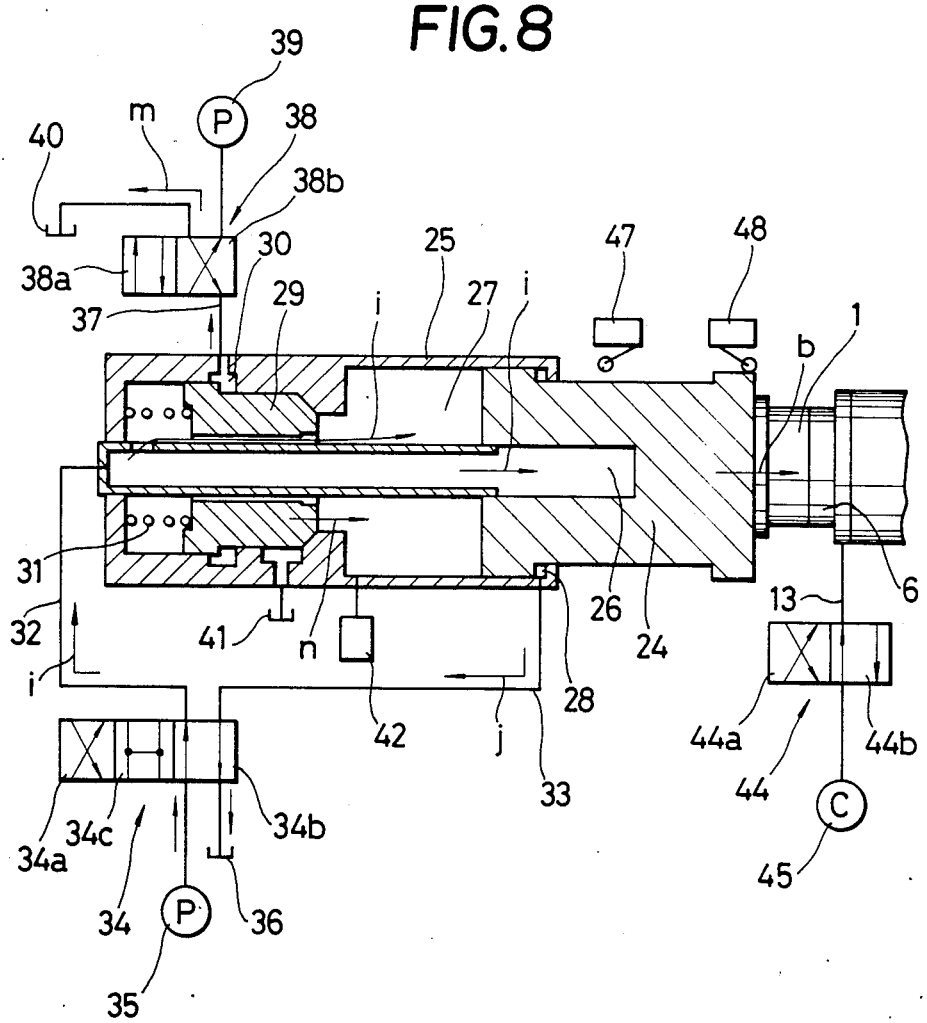
FIG. 8 is a sectional view of the movable die drive unit for urging the movable die against the stationary die during or after injection.

Then, during or after the injection step as described with reference to FIG. 4, the first selector 34 is switched to the second position 34b again as shown in FIG. 8, and simultaneously, the second selector 38 is switched to the second position 38b. Switching is performed by a time set signal and the like from a timer which has been set by a position detection signal of an injection screw in the injection nozzle 8 or injection start.

First, when the second selector 38 is switched to the second position 38b, oil in the fourth hydraulic cylinder 30 is returned into the oil tank 40 in direction of arrow m through the oil supply path 37, and the prefill valve 29 is moved forward by the spring 31 in direction of arrow n. Consequently, reverse oil flow from the second hydraulic cylinder 27 to the oil tank 41 is prevented.

Then, when the first selector 34 is switched to the second position 34b simultaneously with switching of the second selector 38, a large quantity of oil is supplied from the hydraulic pump 35 into the first and second hydraulic cylinders 26 and 27 through the hydraulic pressure supply path 32 in the direction of arrow i. In this case, reverse oil flow from the second hydraulic cylinder 27 to the oil tank 41 is prevented by the prefill valve 29 as described above, so that the pressure especially in the second hydraulic cylinder 27 is increased, and the ram 24 is pressurized to a predetermined high pressure (several hundreds of tons) in the direction of arrow b, thereby providing the pressed state. In this case, oil in the third hydraulic cylinder 28 is returned into the oil tank 36 through the oil supply path 33.

The pressed state is maintained until molding of disc 21 described with reference to FIG. 4 is completed (until the completion of the cooling step for the dies 1 and 6). After disc molding, the third selector 44 is switched to a first position 44a at an adequate time point.

The drive circuit having the configuration and operating in the manner as described above can perform various control operations as follows.

In a 200-ton class apparatus for injection molding an optical disc, the prefill valve 29 is slowly moved forward by the spring 31 in the direction of arrow n in FIG. 8. Therefore, the second selector 38 can be switched to the second position 38a simultaneously with the injection start of the melted plastic material 19 into the cavity 18, and the prefill valve 29 can be moved forward at an early stage of the operation in the direction of arrow n. Alternatively, the ram 24 can be moved backward in the direction of arrow a as described with reference to FIG. 7 by an injecting pressure of the melted plastic material 19 into the cavity 18.

The prefill valve 29 can be closed (moved forward to the position shown in FIG. 8) at the beginning of injection of the melted plastic material 19 into the cavity 18, and the first selector 34 can be switched from the third position 34c to the second position 34b during the injection step. This is the reason why the pressure at the beginning of the injection is low.

At the beginning of injection of the melted plastic material 19 into the cavity 18, the pressed state shown in FIG. 2 need not be complete. In this case, injection can be started in the die open state wherein the dies 1 and 6 are separated by $T_2$ as shown in FIG. 3, and thereafter pressing described with reference to FIG. 8 can be performed. For this purpose, only the front position detection switch 48 for detecting the movement of the ram 24 in the direction of arrow b as described with reference to FIG. 6 must be set at a position for opening the dies.

As has been described above, the apparatus for injection molding articles of the present invention molds the optical disc 21 from polycarbonate resin. FIG. 9 shows measured birefringence values A and B of the disc 21 molded in accordance with the present invention (assume that the values A and B are measured along two directions on the disc 21). The birefringence values over an entire area of the disc 21 from the innermost portion to the outermost portion thereof fall within a practical range of ±35°. Reference symbol C represents a birefringence value of a disc molded in accordance with a conventional manufacturing method. As is apparent from this, the manufacturing method according to the present invention is excellent as compared with the conventional method.

An embodiment of the present invention has been described above. Various changes and modifications can be made based on the technical principle of the present invention.

The drive circuit comprises the hydraulic circuit in the embodiment. However, the drive circuit can comprise a drive circuit using pressurized air.

Similarly, the drive mechanism of the auxiliary die 10 need not comprise the air cylinder 12 but can comprise a hydraulic cylinder or a spring.

The pressure operating mechanism need not comprise the prefill valve 29 but can comprise any other structure.

The present invention is not limited to an apparatus for injection molding an optical disc such as a video disc or a DRAW disc but can be applied to an apparatus for injection molding various other articles. According to the present invention, even when a large-diameter optical disc such as a video disc is molded from resin such as polycarbonate resin having poor moldability, flowability of the melted plastic material injected into the cavity can be greatly improved, and internal strains of the melted plastic material can be minimized. Therefore, to copy signal patterns in the stamper becomes very easy, and birefringence of the injection molded optical disc becomes considerably small, so that an optical disc having excellent optical characteristic can be injection molded.

What is claimed is:

1. In a method for forming articles by injection molding in which a melted plastic material is injected into a cavity defined in a mold, said mold including a movable die, a stationary die, and a stamper for imparting a desired pattern to said article, said stationary die having an auxiliary die in contact with and capable of moving along an outer periphery of said stationary die, said method comprising the steps of:

closing said movable die onto said stationary die under the condition of substantially no pressure, such that a first portion of said auxiliary die is in contact with said movable die and a gap exists between said movable die and a second portion of said auxiliary die;

injecting said melted plastic material into said cavity, and thereby slightly releasing away said movable die from said stationary die by the pressure of the injected melted plastic material while moving said auxiliary die along said outer periphery to maintain said first portion of said auxiliary die in contact with said stationary die when said melted plastic material is injected; and pressing said movable die against said stationary die during injection or after injection to press mold said melted plastic material in said cavity while exhausting gas from said cavity through said gap.

2. A method according to claim 1 wherein said melted plastic material is polycarbonate resin.

3. In a method for forming articles by injection molding in which a melted plastic material is injected into a cavity formed between a movable die and a stationary die, said movable die having a stamper held by holding means and said stationary die having an auxiliary die in contact with and capable of moving along an outer periphery of said stationary die, said method comprising the steps of:

closing said movable die onto said stationary die under the condition of substantially no pressure, such that said auxiliary die is in contact with said holding means and a gap exists between said stamper and said auxiliary die;

injecting said melted plastic material into said cavity, and thereby slightly releasing away said movable die from said stationary die by the pressure of the injected melted plastic material while moving said auxiliary die along said outer periphery to maintain said auxiliary die in contact with said holding means when said melted plastic material is injected; and pressing said movable die against said stationary die during injection or after injection to press mold said melted plastic material in said cavity while exhausting gas from said cavity through said gap.

4. A method according to claim 3 wherein said melted plastic material is polycarbonate resin.

* * * * *